(12) United States Patent
Varma

(10) Patent No.: US 7,719,982 B2
(45) Date of Patent: May 18, 2010

(54) SWITCHING DEVICE UTILIZING FLOW-CONTROL MANAGEMENT

(75) Inventor: Anujan Varma, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 1213 days.

(21) Appl. No.: 11/216,356

(22) Filed: Aug. 31, 2005

(65) Prior Publication Data

US 2007/0047535 A1    Mar. 1, 2007

(51) Int. Cl.
*H04J 3/14*   (2006.01)
*H04L 12/26*  (2006.01)

(52) U.S. Cl. ..................... 370/235; 370/428
(58) Field of Classification Search .............. None
See application file for complete search history.

(56) References Cited

U.S. PATENT DOCUMENTS

| | | | |
|---|---|---|---|
| 6,654,343 B1* | 11/2003 | Brandis et al. | 370/229 |
| 7,286,552 B1* | 10/2007 | Gupta et al. | 370/413 |
| 2003/0126280 A1* | 7/2003 | Yao et al. | 709/234 |
| 2005/0013251 A1* | 1/2005 | Wang et al. | 370/235 |
| 2005/0088969 A1* | 4/2005 | Carlsen et al. | 370/229 |
| 2006/0092845 A1* | 5/2006 | Kwan et al. | 370/235 |

* cited by examiner

*Primary Examiner*—Gregory B Sefcheck
*Assistant Examiner*—Suk Jin Kang
(74) *Attorney, Agent, or Firm*—Ryder, Lu, Mazzeo and Konieczny, LLC; Douglas J. Ryder

(57) ABSTRACT

In some embodiments a switching device is disclosed that includes one or more ingress queues to queue data received from external sources while waiting to forward the data to one or more egress queues. The egress queues queue the data while waiting to transmit the data to external sources. The switching device also includes a switch fabric to provide connectivity between the one or more ingress queues and the one or more egress queues. The switching device further includes an ingress flow-control manager to monitor flow-control state of the one or more ingress queues, and to detect and recover from loss of ON flow-control messages. Other embodiments are otherwise disclosed herein.

9 Claims, 11 Drawing Sheets

SWITCHING DEVICE UTILIZING FLOW-CONTROL MANAGEMENT

BACKGROUND

Store-and-forward devices, such as switches and routers, include a plurality of ingress ports for receiving data and a plurality of egress ports for transmitting data. The data received by the ingress ports is queued in a queuing device, and subsequently dequeued from the queuing device, as a prelude to its being sent to an egress port. The queues are associated with flows (corresponding to an application that transfers data from a source to a destination, or a set of such applications). The transfer of data may be accomplished using any number of protocols including Asynchronous Transfer Mode (ATM), Internet Protocol (IP), and Transmission Control Protocol/IP (TCP/IP). The flows may be based on parameters such as the egress port, the ingress port, class of service, and the protocol associated with the data. Therefore, an ingress port may maintain a large number of queues (e.g., one per flow).

When data is selected from the queue for transmission, it is sent through a data path (typically, a switch fabric) to the appropriate egress ports. The data received at the egress ports is queued in a queuing device before being transmitted therefrom. The queuing device can become full if messages arrive faster than they are being transmitted out. In order to prevent the queues from overflowing, and thus losing data, the egress port needs to indicate to one or more ingress ports that they should stop sending data. This is accomplished by sending flow-control messages from the egress ports to ingress ports where the traffic originates. The flow-control message can be an ON status or an OFF status for ON/OFF flow-control, or it can be a value for more general flow-control. An OFF message indicates that the traffic belonging to one or more flows needs to be turned off and an ON message indicates that the corresponding queue can send traffic again. Such flow-control messages may be sent to individual ingress ports or broadcast to a plurality of (e.g., all) the ingress ports.

The flow-control messages are transported by a switch fabric from the egress side to its ingress side. These messages are vulnerable to loss, because of transient errors and congestion. In addition, the same flow-control message is often sent to many ingress queues distributed over many line cards, as several ingress queues may be feeding traffic into the same egress queue. Because the message needs to be physically replicated and distributed to the line cards, some copies of the message may be lost, preventing the corresponding ingress queues from reacting to the flow-control message. The loss of a flow-control message can disrupt system operation. The loss of an OFF message may result in the ingress ports transmitting into an already full egress queue, causing unintended packet losses. The loss of an ON message can result in a deadlock where the ingress queues that were turned off in response to an earlier OFF message, remain in that state indefinitely.

BRIEF DESCRIPTION OF THE DRAWINGS

The features and advantages of the various embodiments will become apparent from the following detailed description in which.

DETAILED DESCRIPTION

Store-and-forward devices, such as switches and routers, are used in packet networks, such as the Internet, for directing traffic at interconnection points. Store-and-forward devices include a plurality of interface modules, a switch fabric for selectively connecting different interface modules, and a backplane for connecting the interface modules and the switching fabric. The interface modules include receivers (ingress ports) to receive data from and transmitters (egress ports) to transmit data to multiple sources (e.g., computers, other store and forward devices) over multiple communication links (e.g., twisted wire pair, fiber optic, wireless). Each of the sources may be capable of transmitting/receiving data based on different parameters (e.g., speed, quality of service) over the different communication links. The interface modules can transmit/receive data using any number of protocols including, but not limited to, Asynchronous Transfer Mode (ATM), Internet Protocol (IP), and Time Division Multiplexing (TDM). The data may be variable length or fixed length blocks, such as cells, packets or frames.

The data received from external sources is stored in a plurality of queues. The queues may be stored in any type of storage device including a hardware storage device such as semiconductor memory, on-chip memory, off-chip memory, field-programmable gate arrays (FPGAs), random access memory (RAM), or a set of registers. The interface modules may be line cards or chips contained on line cards. A single line card may include a single interface module (receiver or transmitter) or multiple interface modules (receivers, transmitters, or a combination). The interface modules may utilize protocols such as Ethernet (e.g., Gigabit, 10 Base T), ATM, Fibre channel, Synchronous Optical Network (SONET), Synchronous Digital Hierarchy (SDH), or various other types. Hereinafter the interface modules will be referred to by the protocol used (e.g., Ethernet interface module, ATM interface module). A line card having multiple interface modules may have the same type of interface modules (e.g., ATM) or may contain some combination of different interface module types. The backplane may be electrical or optical.

Figure 1:
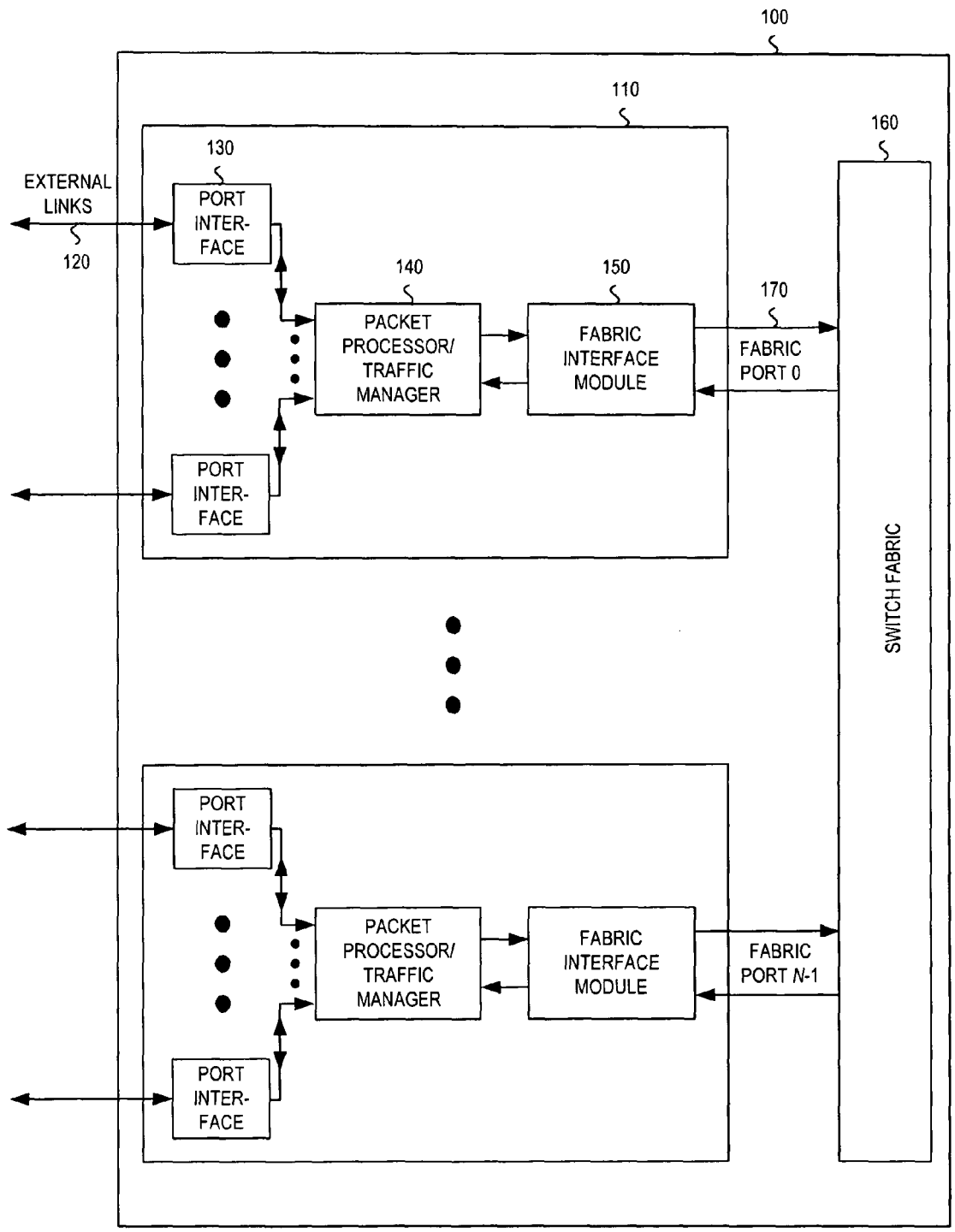
FIG. 1 illustrates an example block diagram of a store-and-forward device, according to one embodiment.

FIG. 1 illustrates an example block diagram of a store-and-forward device 100. The device 100 includes a plurality of line cards 110 that connect to, and receive data from and transfer data to, external links 120. The line cards include port interfaces 130, packet processor and traffic manager devices 140, and fabric interfaces 150. The port interfaces 130 provide the interface between the external links 120 and the line card 110. The port interface 130 may include a framer, a media access controller, or other components required to interface with the external links 120. The packet processor and traffic manager device 140 receives data from the port interface 130 and provides forwarding, classification, and queuing based on flow (e.g., class of service) associated with the data. The fabric interface 150 provides the interface necessary to connect the line cards 110 to a switch fabric 160. The fabric interface 150 includes an ingress port interface (from the line card 110 to the switch fabric 160) and an egress port interface (from the switch fabric 160 to the line card 110). For simplicity only a single fabric interface 150 is illustrated on each line card, however multiple fabric interfaces 150 could be contained on each line card 110.

The switch fabric 160 provides re-configurable data paths between the line cards 110 (or fabric interfaces). The switch fabric 160 includes a plurality of fabric ports 170 (addressable interfaces) for connecting to the line cards 110 (port interfaces). Each fabric port 170 is associated with a fabric interface (pair of ingress fabric interface modules and egress fabric interface modules). The switch fabric 160 can range from a simple bus-based fabric to a fabric based on crossbar (or crosspoint) switching devices. The choice of fabric depends on the design parameters and requirements of the store-and-forward device (e.g., port rate, maximum number of ports, performance requirements, reliability/availability requirements, packaging constraints). Crossbar-based fabrics may be used for high-performance routers and switches because of their ability to provide high switching throughputs.

It should be noted that a fabric port 170 may aggregate traffic from more than one external port (link) associated with a line card. A pair of ingress and egress fabric interface modules is associated with each fabric port 170. When used herein the term fabric port may refer to an ingress fabric interface module and/or an egress fabric interface module. An ingress fabric interface module may be referred to as a source fabric port, a source port, an ingress fabric port, an ingress port, a fabric port, or an input port. Likewise an egress fabric interface module may be referred to as a destination fabric port, a destination port, an egress fabric port, an egress port, a fabric port, or an output port.

Because packets arriving at multiple line cards may contend for a common destination port, packets may need to be queued at the input ("ingress") to the switch fabric 160, waiting for their turn to be transferred through the switch fabric 160. These queues may be maintained by the packet processor/traffic manager 140 or a fabric interface module 150, depending on the architecture of the system. One way to organize the queues at the ingress to the switch fabric 160 is to maintain a separate queue for packets destined to each destination port of the switch fabric 160. Thus, packets destined to different fabric ports are isolated from one another. In addition, the packets destined to a specific fabric port can further be distributed into multiple queues based on their relative priority level, so that packets can be sent out to a destination fabric port in priority order. Such a method of organizing the queues at the ingress to the switch fabric 160 based on the output port (and optionally, priority level) is known as "virtual output queuing".

Figure 2:
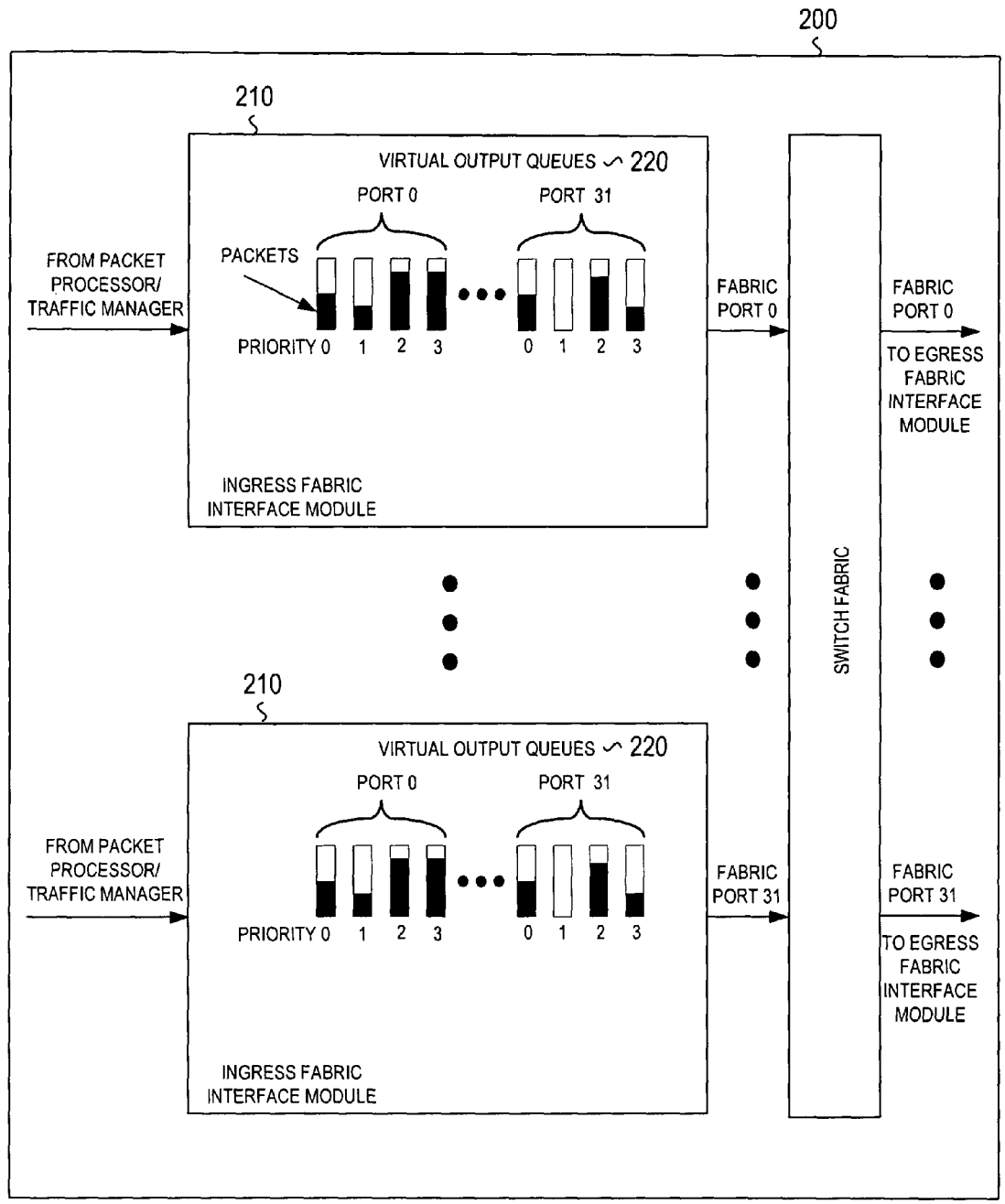
FIG. 2 illustrates an example block diagram of a store-and-forward device incorporating a switch fabric with virtual output queues, according to one embodiment.

FIG. 2 illustrates an example block diagram of a store-and-forward device 200 incorporating a switch fabric with virtual output queues. The store-and-forward device 200 includes a plurality of ingress fabric interface modules 210 to receive data (e.g., packets) from packet processor/traffic managers. The ingress fabric interface modules 210 include virtual output queues 220 to hold the data. The virtual output queues 220 for each ingress port 210 may be associated with each egress port and each priority per egress port. As illustrated, each ingress port 210 has 32 egress ports (labeled 0-31) and four priority levels (labeled 0-3) so that there are a total of 128 virtual output queues.

A packet transferred through the switch fabric, on reaching its destination fabric port ("egress" side), may go through some egress processing before being transmitted out of the line card to an external link. Accordingly, the egress ports may contain queues to hold the data prior to transmission to external links. Often the fabric is designed to deliver packets at a peak rate that is higher than the speed of the external link, or the processing rate of the egress processing function. This may result in congestion at the egress of the switch fabric (overflow of the queues), resulting in a potential loss of packets. Accordingly, the flow of data to a particular egress port may be turned off or throttled from a particular virtual output queue(s) or all virtual output queues associated with the egress port to prevent overflow of the associated egress queue. The flow may be turned off or throttled by transmitting flow-control messages to the associated virtual output queue(s).

Figure 3:
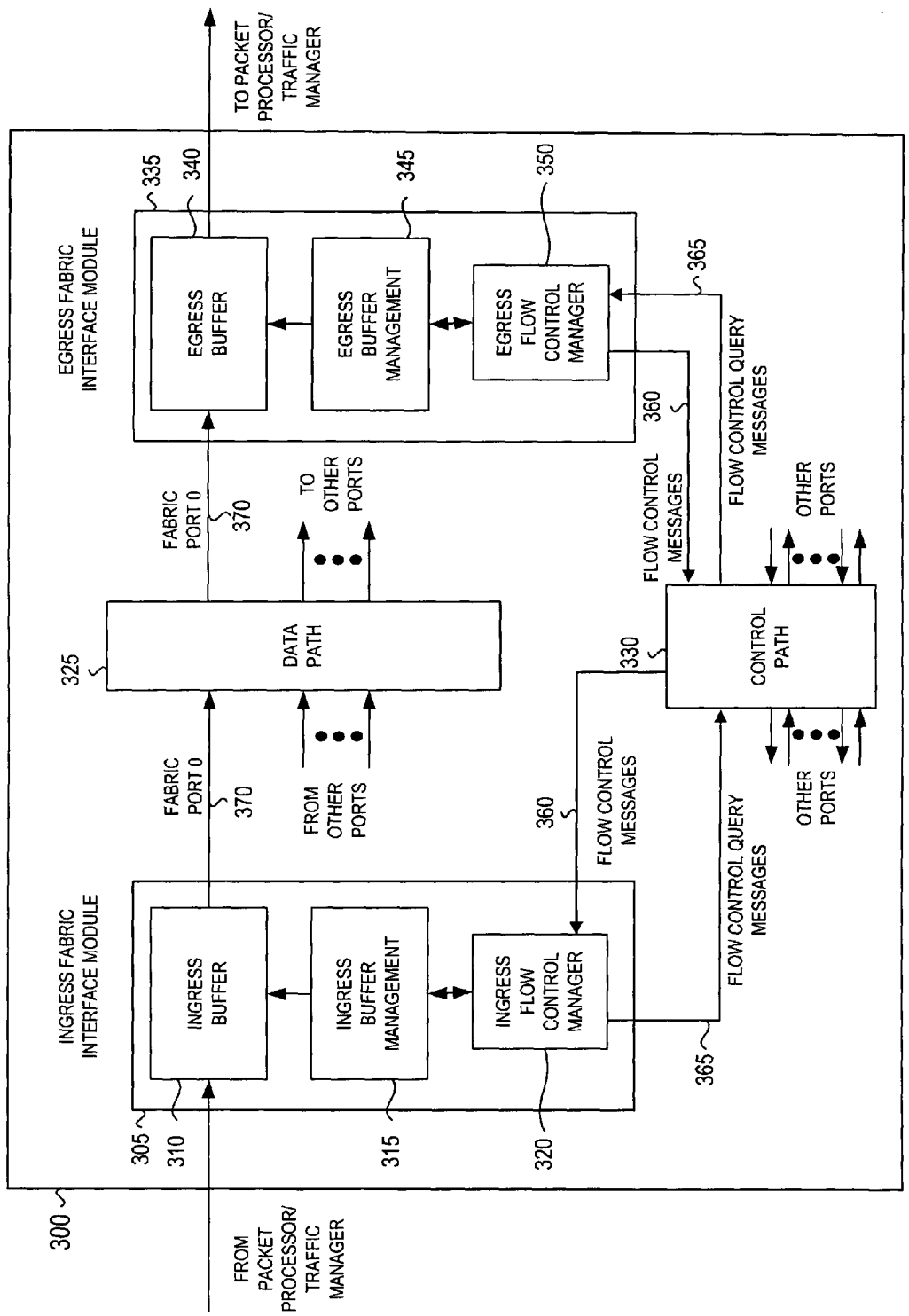
FIG. 3 illustrates an example flow-control system, according to one embodiment.

FIG. 3 illustrates an example block diagram of a flow-control system 300. The flow-control system 300 includes one or more ingress fabric interface modules 305, one or more egress fabric interface modules 335, a data path 325 to carry data between and among them, a control path 330 to carry control messages between and among them, and a fabric scheduler (not illustrated). The data path 325 may be a switch fabric (e.g., 160) that switches the data between the one or more ingress fabric interface modules 305 and the one or more egress fabric interface modules 335. The control path 330 may be the switch fabric or may be a separate control path that is used to route control messages between the one or more ingress fabric interface modules 305 and the one or more egress fabric interface modules 335. A fabric port may be formed from a pair of ingress and egress fabric interface modules that are packaged together, for example on the same chip or board (e.g., line card).

Packets arrive at the ingress fabric interface module 305 from a packet processor/traffic manager on the line card. Similarly, packets 370 transmitted over the data path 325 to the egress fabric interface module 335 are forwarded to the packet processor on the line card for egress processing. For ease of understanding only a single ingress fabric interface module 305 and a single egress fabric interface module 335 are illustrated.

The ingress fabric interface module 305 includes an ingress buffer 310, an ingress buffer manager 315 and an ingress flow-control manager 320. The ingress buffer 310 contains a set of virtual output queues (ingress queues) that are organized based on destination port, or destination port and other factors, such as priority level. If the virtual output queues are based on destination port and priority, and there are N fabric ports and P priority levels in the system, then there would be a total of N×P distinct queues. A packet arriving from the packet processor at the ingress fabric interface module 305 is stored in a corresponding virtual output queue based on its destination fabric port and its priority level. The ingress buffer manager 315 manages the ingress buffer 310 and the virtual output queues contained therein. The ingress flow-control manager 320 receives flow-control messages 360 and generates flow-control query messages 365.

The egress fabric interface module 335 includes an egress buffer 340, an egress buffer manager 345 and an egress flow-control manager 350. The egress buffer 340 contains a set of egress queues that hold the packets arriving from the data path 325 until they can be forwarded to the packet processor for egress processing. The egress queues can be organized in various ways. For example, the egress queues may be organized as a single queue for all the incoming packets; as N separate queues, one per ingress port; as P separate queues, one per priority level; or as N×P separate queues, one per ingress port and priority level. The egress buffer manager 345 manages the egress buffer 340 and the egress queues contained therein. The egress flow-control manager 350 generates flow-control messages 360, and receives flow-control query messages 365.

The egress flow-control manager 350 keeps track of the congestion state of the egress queues and generates flow-control messages 360 for transmission to the ingress modules 305 based on the congestion state of the egress queues. The flow-control messages 360 are transported to the ingress modules 305 via the control path 330. The control path 330 may be the same path as the data path 325 (used to transport data packets), or may be a separate path. FIG. 3 illustrates a separate control path 330. The ingress modules 305 act upon these messages by either ceasing the transmission of the packets 370 from the virtual output queues specified by the flow-control message, or by changing the dequeue (transmission) rate, depending on the type of flow-control employed.

Figure 4:
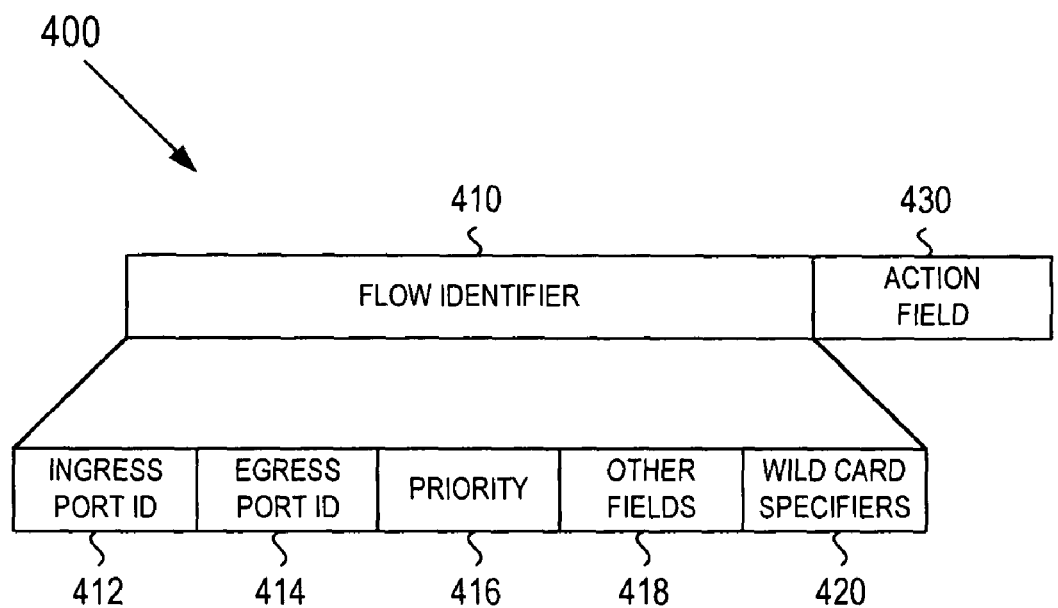
FIG. 4 illustrates an example flow-control message, according to one embodiment.

FIG. 4 illustrates an example flow-control message 400 transmitted from an egress fabric interface module to one or more ingress fabric interface modules. The flow-control message 400 includes a flow identifier field 410 and an action field 430. The flow identifier field 410 may include ingress port ID 412 (the destination of flow-control message), egress port ID 414 (the source of flow-control message), priority 416 associated with the traffic to be flow-controlled, other fields 418, and wild card specifiers 420 (defines what different wildcards indicate in each other field). These fields contain sufficient information to route the flow-control message 400 to its intended recipient ingress ports, and to locate the virtual output queue or set of virtual output queues to be flow-controlled within the ingress module. One or more of the sub-fields in the flow identifier field 410 may be wild-carded (using the wild card specifiers 420). For example, the ingress port ID 412 may be marked to a wildcard that indicates "all ingress ports," implying that the flow-control message is directed at all the ingress ports in the system. Likewise, priority 416 may be marked to a wildcard that indicates "all priorities" indicating that the virtual output queues feeding traffic to the designated egress port at all priority levels are to be flow-controlled.

According to one embodiment, the flow-control message 400 may simply specify whether the flow-control should be ON or OFF. In this embodiment, the action field 430 is a single bit specifying the intended action to be taken by the ingress module. For example, if the bit is active (e.g., set to '1') flow-control is set ON and if the bit is inactive (e.g., set to '0') the flow-control is set OFF. The OFF state specifies that dequeuing of traffic from the associated ingress queues is to be stopped, and the ON state specifies that the dequeuing can resume.

According to other embodiments, the flow-control message may specify a rate at which the flow should proceed (rate of flow). The rate of flow may proceed from full flow, through a plurality of more restrictive flows, to no flow. For example, if two bits were used to define the flow-control, a '11' may indicate full flow, a '10' may indicate 67% flow, a '01' may indicate 33% flow, and a '00' may indicate no flow.

Figure 5:
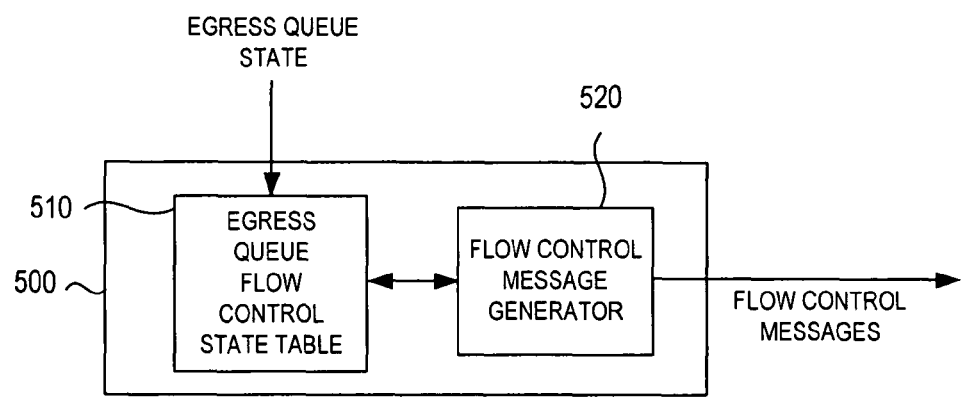
FIG. 5 illustrates an example block diagram of an egress flow-control manager, according to one embodiment.

FIG. 5 illustrates an example block diagram of an egress flow-control manager 500. The egress flow-control manager 500 includes an egress queue flow-control state table 510 and a flow-control message generator 520. The egress queue flow-control state table 510 tracks the congestion state of each queue. According to one embodiment, the congestion state is either "congested" or "free" and the state can be identified with a single bit. A "congested" state indicates that the egress queue contains more data than a given threshold T1 (e.g., 90% capacity, 200 packets, 3000 bytes). A "free" state indicates that the egress queue is not congested as it contains less data than a given threshold T2 (e.g., 50% capacity, 50 packets, 1000 bytes). The flow-control message generator 520 generates flow-control messages based on changes in the congestion state of the queues. The flow-control message generator 520 may generate ON/OFF flow-control messages. If an egress queue becomes "congested", the flow-control message generator 520 generates an OFF flow-control message. If an egress queue becomes "free", the flow-control message generator 520 generates an ON flow-control message. Initially, the congestion state of all egress queues may be set to free in the egress queue flow-control state table 510.

Figure 6:
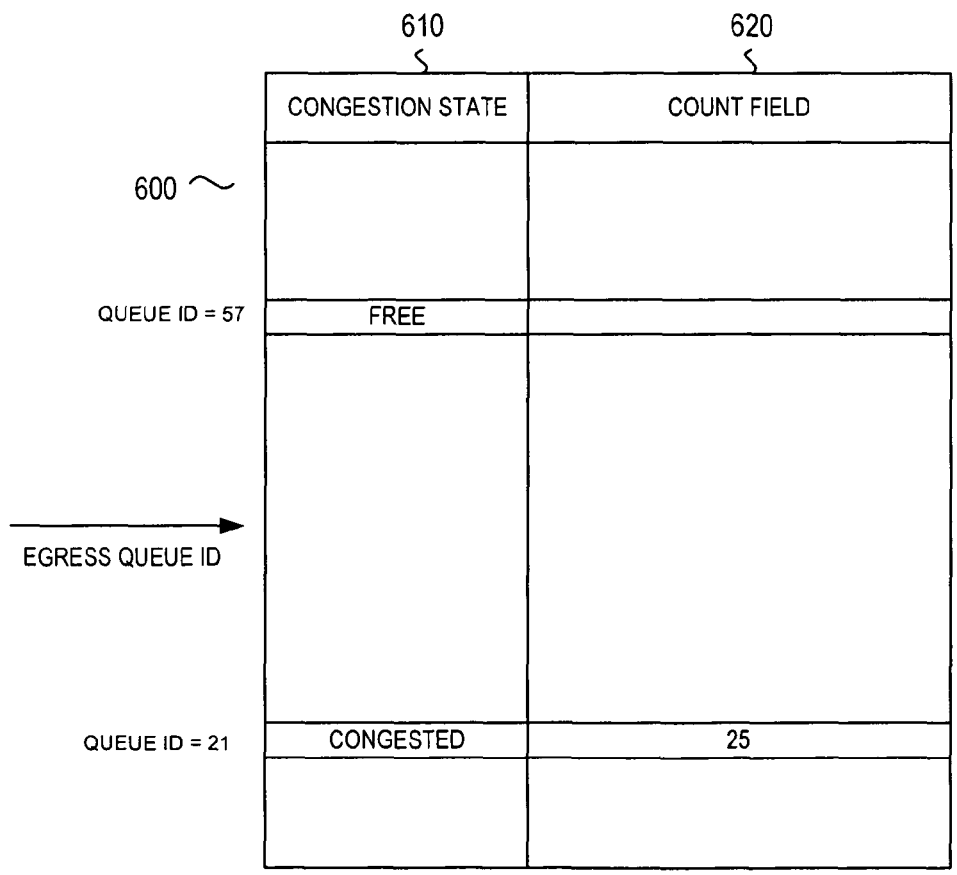
FIG. 6 illustrates an example egress queue flow-control table, according to one embodiment.

FIG. 6 illustrates an example egress queue flow-control state table 600. The egress flow-control state table 600 includes one entry per egress queue, each entry consisting of a congestion state 610 and a count 620. According to one embodiment, the congestion state 610 is a single bit to indicate whether the queue is "congested" or "free". The count field 620 is set to a given value for controlling re-transmission of OFF messages, as the OFF control message may incur delays in reaching the associated ingress module(s) and turning off the traffic directed at the egress queue from the ingress module(s). The given value in the count field 620 is chosen such that an OFF message will only be retransmitted if the previous OFF message was not received and processed correctly by the destination ingress module(s). Thus, the given value should be large enough to account for the normal time taken to process the OFF message. However, in order to ensure the egress queue does not overflow the given value must be less than or equal to the maximum amount of data that the egress queue can receive during the time interval between the first transmission of the OFF message and data ceasing to arrive at the egress queue as a result of the flow-control taking effect at the virtual output queues (ingress queues). The given value may be defined in numerous terms including as a byte count or as a packet count.

When the egress flow-control manager sends an OFF flow-control message to turn off traffic arriving into a specific egress queue, the associated count field 620 is set to the given value. Each time the egress queue receives data after transmission of the OFF message a remaining value in the appropriate count field 620 is decremented by the amount of data received by the egress queue. When the remaining value in the appropriate count field 620 reaches zero or a negative value, and traffic continues to arrive at the egress queue, the egress flow-control manager retransmits the OFF message.

Figure 7:
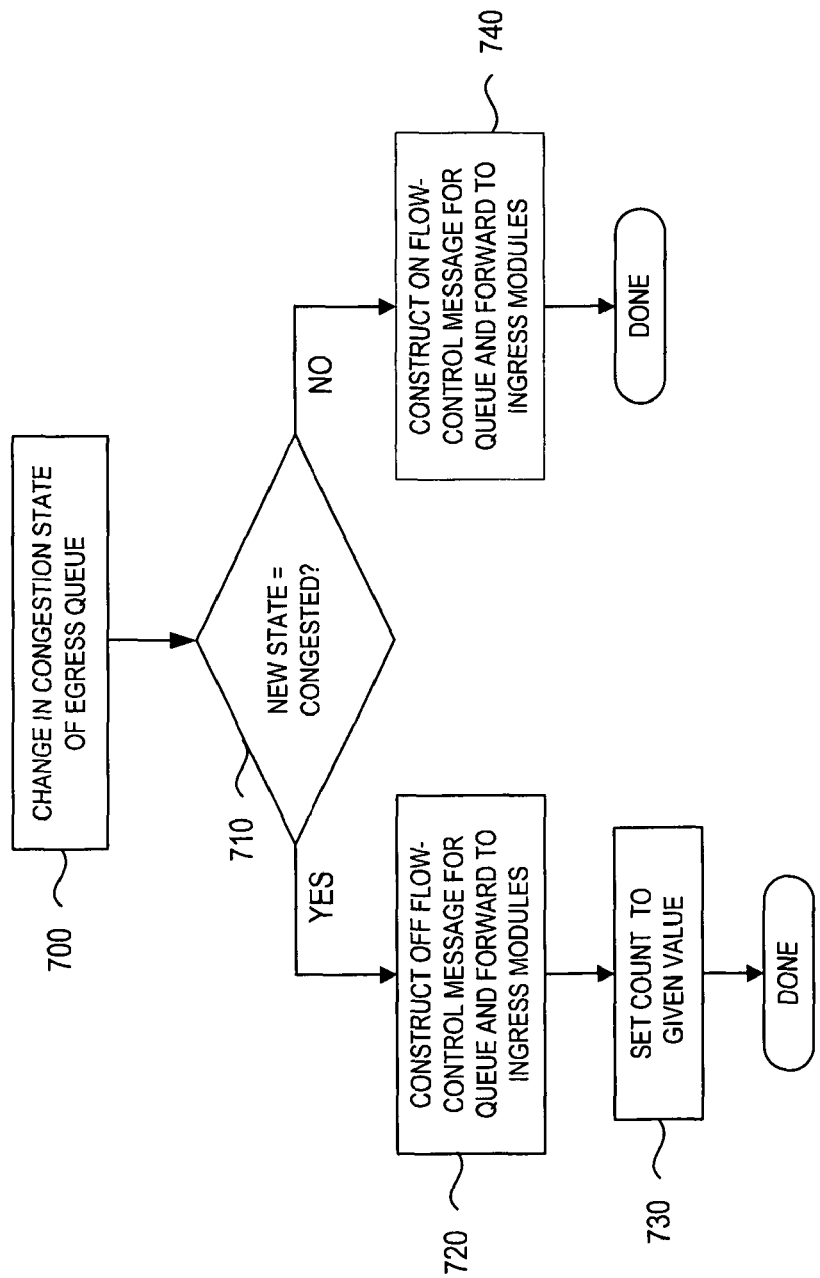
FIG. 7 illustrates an example flow chart for generation of OFF and ON flow-control messages, according to one embodiment.

FIG. 7 illustrates an example flowchart for generation of OFF and ON flow-control messages in response to changes in the congestion state of an egress queue. Initially, a change in congestion state of an egress queue (e.g., "congested to free", "free to congested") is detected by the egress flow-control manager 700. The egress flow-control manager makes a determination as to whether the new state is "congested" 710. If the determination 710 is that the new state is "congested" (710 Yes), this indicates a transition from "free to congested". Accordingly, the egress flow-control manager constructs an OFF flow-control message and forwards it to the ingress modules sending traffic to the egress queue 720. The count field associated with the egress queue in the egress queue flow-control state table is then set to the given value for controlling the retransmission of the OFF message 730.

If the determination 710 is that the new state is "free" (710 No), this indicates a transition from "congested to free". The egress flow-control manager constructs an ON flow-control message and forwards it to all the ingress modules sending traffic to the egress queue 740.

Figure 8:
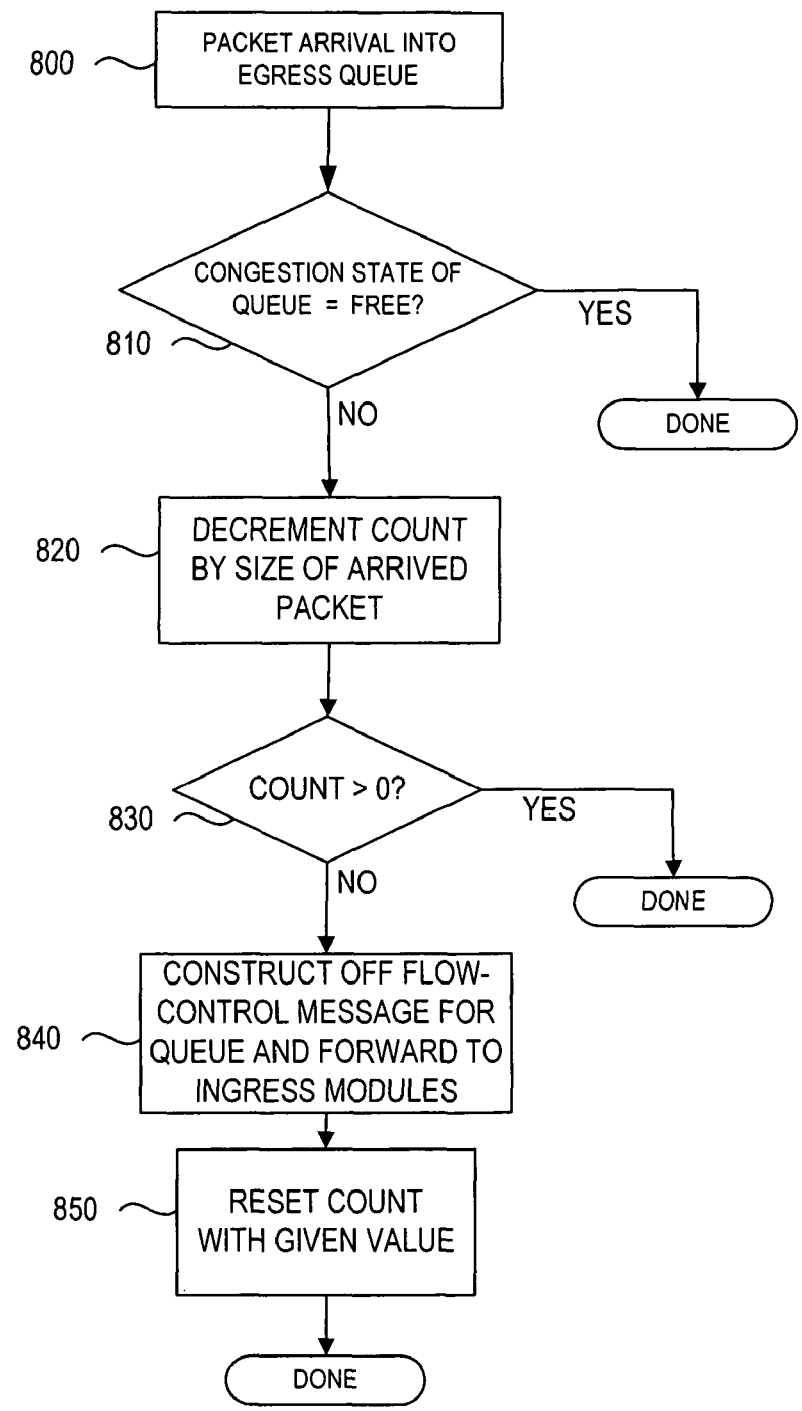
FIG. 8 illustrates an example flow chart for the retransmission of OFF messages, according to one embodiment.

FIG. 8 illustrates an example flowchart for retransmission of OFF flow-control messages. Initially a packet arrives into an egress queue from the switch fabric data path 800. The congestion state of the egress queue into which the packet is being queued is examined and a determination is made as to whether the state is "free" 810. If the determination 810 is that the state is "free" (810 Yes), no further action is needed. If the determination 810 is that the state is "congested" (810 No), the remaining value in the appropriate count field (associated with the egress queue) in the egress queue flow-control state table is decremented by the appropriate amount (e.g., bytes, packets) 820. For example, if the value was in terms of bytes the remaining value may be decremented by the size of the received packet, and if the value was in terms of number of packets then the remaining value may be decremented by 1. A test is then performed to check if the new remaining value (in the appropriate count field) is greater than zero 830. If the new remaining value is greater than zero (830 Yes), no further action is needed. If the new remaining value is less than or equal to zero (830 No), it is likely that one of the ingress modules did not receive the original OFF message and another OFF message is constructed and forwarded to the ingress modules sending traffic to the egress queue 840.

According to one embodiment, the OFF message is forwarded to all the ingress modules that source traffic into the egress queue even though some of them may have received the original transmission of the OFF message and turned off their traffic in response. These duplicate transmissions are likely not harmful, because the duplicate messages do not cause any action at the ingress modules that have already turned off their traffic in response to the original message. The count field associated with the egress queue in egress queue flow-control state table is then reset to the given value 850. If the current transmission of the OFF message still fails to turn off all the incoming traffic into the egress queue further retransmissions will result.

If an ON flow-control message forwarded by an egress module fails to reach one or more of the ingress modules to which it is directed, traffic from some ingress queues will remain turned off indefinitely. According to one embodiment (referring back to FIG. 3), the ingress flow-control manager 320 associated with the ingress fabric interface module 305 keeps track of the congestion state of the virtual output queues (ingress queues) incorporated within the ingress buffer 310 and generates a flow-control query messages for transmission to the egress modules.

Figures 9, 10:
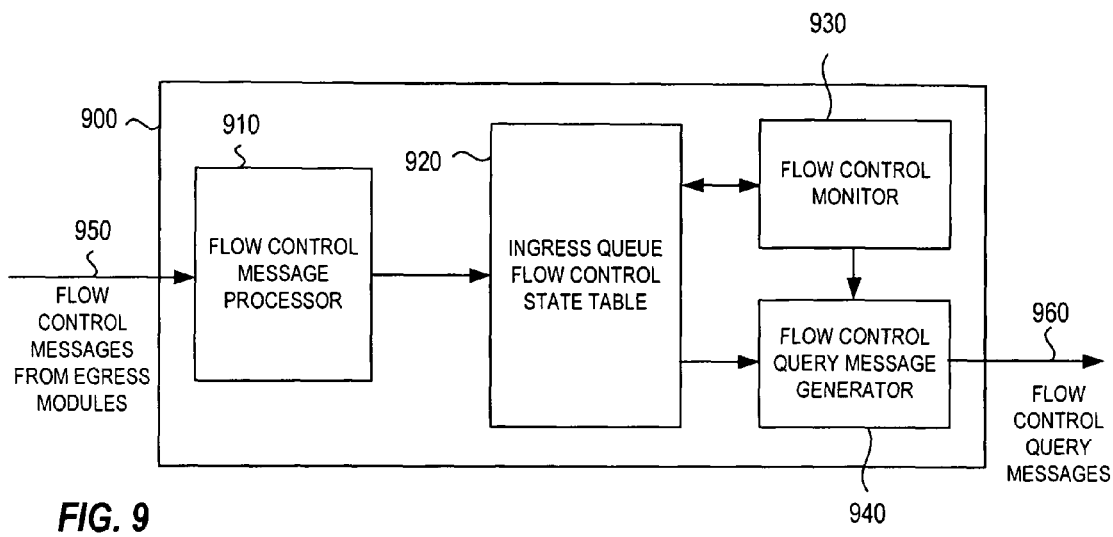
FIG. 9 illustrates an example block diagram of an ingress flow-control manager, according to one embodiment.
FIG. 10 illustrates an example ingress queue flow-control table, according to one embodiment.

FIG. 9 illustrates an example block diagram of ingress flow-control manager 900. The ingress flow-control manager 900 includes a flow-control message processor 910, an ingress queue flow-control state table 920, a flow-control monitor 930, and a flow-control query message generator 940. The flow-control message processor 910 receives flow-control messages 950 from egress modules, processes the messages, and sets the state of associated virtual output queue (s). The ingress queue flow-control state table 920 keeps track of the state of each virtual output queue. According to one embodiment, the state is either "ON" or "OFF". An ON state indicating that the virtual output queue can transmit data and an OFF state indicating that the virtual output queue is prevented from transmitting data. The flow-control monitor 930 periodically examines the state of each virtual output queue. The flow-control query message generator 940 is responsible for composing a flow-control query message 960 and forwarding the message to the egress side of the switch fabric.

FIG. 10 illustrates an example ingress queue flow-control state table 1000. The ingress queue flow-control state table 1000 includes an entry per virtual output queue, each entry including a state 1010 and a timeout count 1020. According to one embodiment, the state 1010 is either "ON" or "OFF" and accordingly can be identified by a single bit. Traffic from a particular virtual output queue can be dequeued and forwarded across the switch fabric to the associated egress modules only if the virtual output queue is in the ON state. The dequeuing is suspended while the virtual output queue is in the OFF state. The timeout count 1020 is valid only for virtual output queues in the OFF state. The timeout count 1020 is a given value associated with an amount of time (e.g., seconds, scheduling cycles) that will pass prior to generation of a flow-control query message. The timeout count 1020 should be chosen in such a way that, during normal operation, queries are generated only in response to losses of ON flow-control messages. If the given value is chosen too small, query messages may be generated too early. If the given value is chosen too large, the loss of an ON message may not be detected for a long time, resulting in loss of throughput and starvation of traffic. Ideally, the given value for the timeout count 1020 should be set to account for the time that it normally takes for a congested egress queue to revert to the free state.

Referring back to FIG. 9, the ingress flow-control manager 900 initially sets the state 1010 of all virtual output queues to the ON state. Thereafter, the state of a virtual output queue can change only by the arrival of a flow-control message from the egress side of the switch fabric. That is, if an OFF flow-control message is received at the ingress module, the flow-control message processor 910 sets the state 1010 of the virtual output queue(s) specified by the flow identifier of the flow-control message to OFF. The state 1010 is changed to ON when a subsequent ON flow-control message is received in which the flow identifier specifies the same virtual output queue(s).

To prevent a virtual output queue from being stuck permanently in the OFF state because of the loss of an ON flow-control message, when the flow-control message processor 910 changes the state of a virtual output queue to OFF it also sets the associated timeout count 1020 to the given value. The flow-control monitor 930 periodically (e.g., seconds, scheduling cycles) examines the state 1010 of each virtual output queue and the timeout count 1020 for each virtual output queue in an OFF state. If the timeout count 1020 has elapsed for an OFF state virtual output queue, the flow-control query message generator 940 generates the associated flow-control query message 960.

Figure 11:
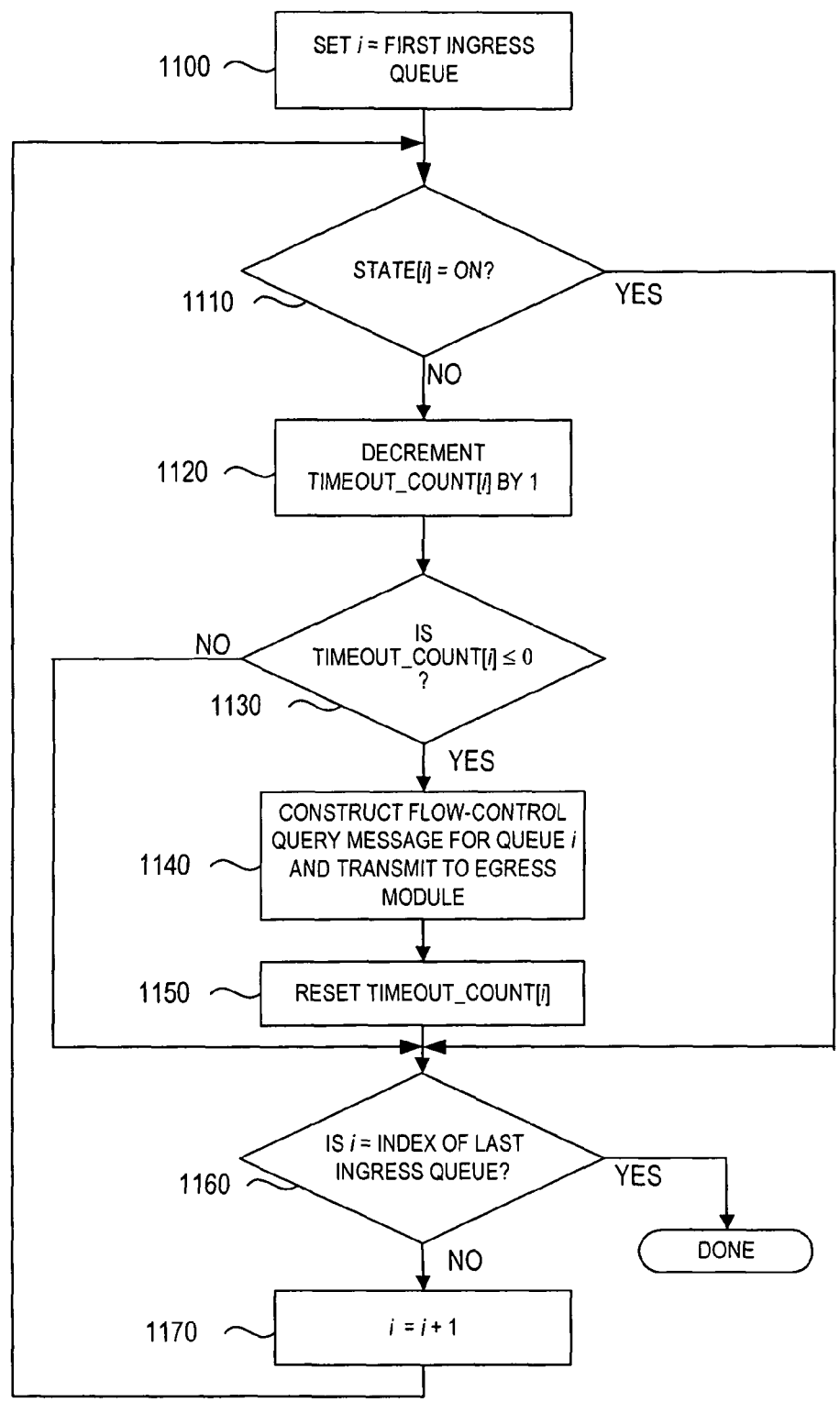
FIG. 11 illustrates an example ingress flow-control monitoring process, according to one embodiment.

FIG. 11 illustrates an example flowchart for generating flow-control query messages. Initially, an index i is set to the first virtual output queue (ingress queue) in the ingress module 1100. The state of the virtual output queue i is examined and a determination is made as to whether the state is "ON" 1110. If the determination is that the state is "ON" (1110 Yes), no action is taken for the virtual output queue i. If the determination is that the state is "OFF" (1110 No), the timeout count is decremented accordingly (e.g., by 1 for scheduling cycles) for the virtual output queue i 1120. A determination is then made as to whether the timeout count is now less than or equal to zero 1130. If the timeout count is greater than zero (1130 No), no action is taken for the virtual output queue i. If the timeout count is zero or less (1130 Yes), the flow-control query message generator composes a flow-control query message for virtual output queue i and forwards the message to the corresponding egress module 1140. The query timeout count for virtual output queue i is then reset to the given value 1150. A determination is then made as to whether index i has reached the last virtual output queue during the current scan 1160. If the determination is that the virtual output queue i is the last virtual output queue (1160 Yes) the process is complete. If the determination is that the virtual output queue i is not the last virtual output queue (1160 No) the index i is incremented by one 1170 and the process returns to 1110.

Figure 12:
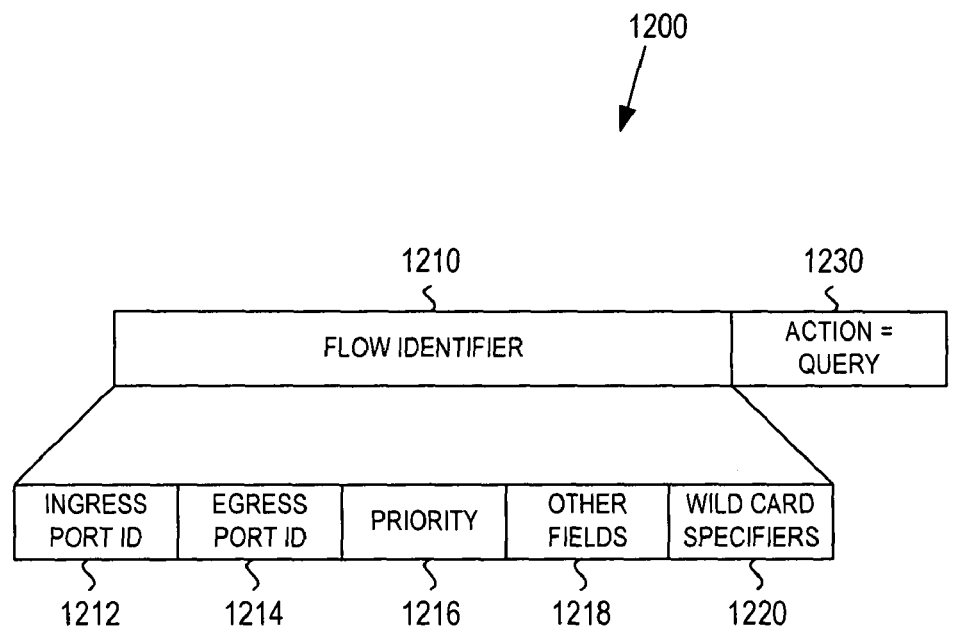
FIG. 12 illustrates an example flow-control query message, according to one embodiment.

FIG. 12 illustrates an example flow-control query message 1200. The format is similar to that of the flow-control message in FIG. 4 in that it includes a flow identifier 1210 and an action field 1230 (the action field 1230 specifies that the message is a query). The flow identifier 1210 includes ingress port ID 1212, egress port ID 1214, priority 1216, other fields 1218 and wild card specifiers 1220. The egress port id 1212 and priority 1216 are derived from the index i of the virtual output queue. The egress port id 1214 is used to route the query message to the egress module. Because the query message is sent in the direction of the data flow (from the ingress side of the fabric to the egress side), the ingress module can forward them to the switch fabric in the same way as data packets, with a special bit or field in the header of the message to distinguish it from data packets. Note that a flow-control query message may be addressed to a single egress queue, whereas a flow-control message may be addressed to many (or all) virtual output queues.

Figure 13:
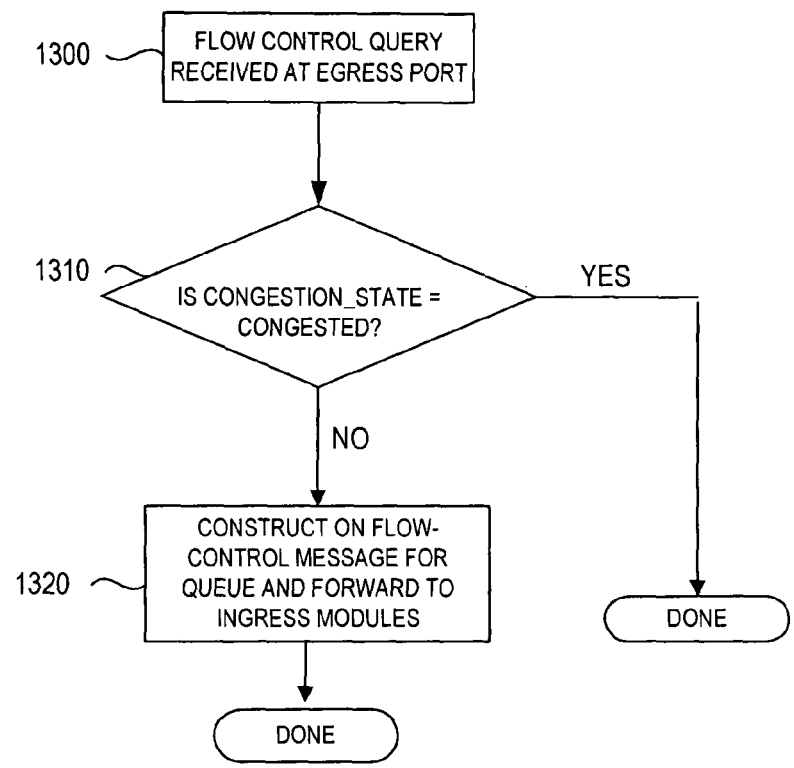
FIG. 13 illustrates an example process performed by the egress flow-control manager, according to one embodiment.

FIG. 13 illustrates an example process flow for the egress flow-control manager when a flow-control query message is received. Initially a flow-control query message is received 1300. The congestion state of the egress queue is examined and a determination is made as to whether the congestion state is "congested" 1310. If the state is "congested" (1310 Yes), no action is needed. If the congestion state is free (1310 No), this indicates that an ON message previously transmitted by the egress module was likely lost. Therefore, a duplicate ON message is constructed and forwarded to the virtual output queue to which the initial ON message was sent 1320. Note that, although some of the virtual output queues may have received the original ON message without errors, sending them duplicate copies of the ON message likely causes no undesirable effects. This is likely better than sending the ON message to only the virtual output queue that originated the query message because the duplicate ON messages can be formatted and transmitted identical to the original ON message, and if multiple virtual output queues have failed to receive the original ON message a single re-transmission will reach all of them.

The above embodiment assumes that flow-control is performed on a per-queue basis. In another embodiment, flow-control is performed for groups of queues. In that case, egress fabric interface modules need to maintain the congestion state for groups of queues instead of individual queues. Similarly, the ingress modules maintain the on/off flow-control state on a per-group basis. The mechanisms remain unchanged otherwise.

Although this specification has been illustrated by reference to specific embodiments, it will be apparent that various alterations and modifications may be made which clearly fall within the intended scope. Reference to "one embodiment" or "an embodiment" is meant only to indicate that a particular feature, structure or characteristic described is included in at least one embodiment. Therefore, it should not be construed that all instances of the phrase "in one embodiment" refer to the same or a single embodiment.

Different implementations may feature different combinations of hardware, firmware, and/or software. In one example, machine-readable instructions can be provided to a machine (e.g., an ASIC, special function controller or processor, FPGA or other hardware device) from a form of machine-accessible medium. A machine-accessible medium may represent any mechanism that provides (i.e., stores and/or transmits) information in a form readable and/or accessible to the machine. For example, a machine-accessible medium may include: ROM; RAM; magnetic disk storage media; optical storage media; flash memory devices; electrical, optical, acoustical or other form of propagated signals (e.g., carrier waves, infrared signals, digital signals); and the like The various embodiments are intended to be protected broadly within the spirit and scope of the appended claims.

What is claimed is:

1. A switching device comprising:
    one or more ingress queues to queue data received from external sources while waiting to forward the data to one or more egress queues, wherein the egress queues queue the data while waiting to transmit the data to external sources;
    a switch fabric to provide connectivity between said one or more ingress queues and the one or more egress queues;
    an egress flow-control manager to monitor congestion state of the one or more egress queues, to generate and forward a flow-control message to at least a subset of the one or more ingress queues that are associated with an egress queue that had a change in the congestion state, to monitor amount of data received by the egress queue after forwarding an OFF flow-control message, and to forward another OFF flow-control message if the egress queue receives at least a given amount of data after forwarding previous OFF flow-control message; and
    an ingress flow-control manager to monitor flow-control state of said one or more ingress queues, and to detect and recover from loss of ON flow-control messages, wherein said ingress flow-control manager tracks amount of time that an ingress queue has had an off status and ascertains congestion state of an associated egress queue if an ingress queue has had an off status for longer than a given amount of time, wherein said ingress flow-control manager ascertains the congestion state of the associated egress queue by sending a query to an egress flow-control manager that monitors congestion state of the egress queues.

2. The device of claim 1, wherein the query is transported through said switch fabric.

3. The device of claim 1, wherein the query is transported through a control path separate from said switch fabric.

4. A method comprising:
    queuing data received from external sources in one or more ingress queues;
    queuing data to be transmitted to external sources in one or more egress queues;
    providing connectivity between the one or more of ingress queues and the one or more egress queues;
    monitoring flow-control state of the one or more ingress queues;
    monitoring congestion state of the one or more egress queues;
    generating and forwarding flow-control messages to at least a subset of the one or more ingress queues that are associated with an egress queue that had a change in the congestion state, wherein an off flow-control message is generated to turn off flow of data if the congestion state of the egress queue becomes congested;

tracking amount of time that the flow-control state of an ingress queue has been identified in an off state;

ascertaining the congestion state for an associated egress queue by sending a query to the associated egress queue if an ingress queue has had an off state for longer than a given amount of time;

determining amount of data received by the egress queue after forwarding the off flow-control message;

determining if the amount of data received by the egress queue is greater than or equal to a given amount of data; and forwarding another off flow-control message if the data received is greater than or equal to the given amount of data.

5. The method of claim 4, further comprising generating and forwarding an on flow-control message to the ingress queue in response to the query if the congestion state of the associated egress queue is determined to be free.

6. The method of claim 4, wherein an on flow-control message is generated to turn on flow of data if the congestion state of the egress queue becomes free.

7. A store and forward device comprising a plurality of line cards to receive and transmit data to external sources, wherein the plurality of line cards include dynamic random access memory responsive to said store and forward device, the dynamic random access memory providing a plurality of ingress queues to queue data received from the external sources and a plurality of egress queues to queue data to be transmitted to the external sources;

a switch fabric to provide selective connectivity between the plurality of ingress queues and the plurality of egress queues;

an egress flow-control manager to monitor congestion state of the plurality of egress queues, to generate and forward a flow-control message to at least a subset of the plurality ingress queues that are associated with an egress queue that had a change in the congestion state, to generates an off flow-control message to turn off flow of data if the congestion state of the egress queue becomes congested, to monitor amount of data received by the egress queue after forwarding the off flow-control message, and to forward another off flow-control message if the egress queue receives at least a given amount of data after forwarding previous off flow-control message; and an ingress flow-control manager to monitor flow-control state of the plurality of ingress queues, and to detect and recover from loss of ON flow-control messages by monitoring amount of time an ingress queue has been identified in an off state and generating and forwarding a query to the egress flow-control manager if flow for an ingress queue has been identified in the off state for at least some given time frame.

8. The device of claim 7, wherein the egress flow-control manager forwards an on flow-control message to the ingress queue in response to the query if the congestion state of an associated egress queue is determined to be free.

9. A switching device comprising a plurality of ingress queues to queue data received from external sources;

a plurality of egress queues to queue data to be transmitted to the external sources;

a switch fabric to provide selective connectivity between the plurality of ingress queues and the plurality of egress queues;

an egress flow-control manager to monitor congestion state of the plurality of egress queues, to generate and forward a flow-control message to control flow of data from at least a subset of the plurality ingress queues that are associated with an egress queue that had a change in the congestion state, to monitor amount of data received by the egress queue after forwarding an OFF flow-control message, and to forward another OFF flow-control message if the egress queue receives at least a given amount of data after forwarding previous OFF flow-control message; and an ingress flow-control manager to receive the flow-control message from the egress flow-control manager and to manage the flow-control of the plurality of ingress queues, wherein the ingress flow-control manager is further to detect and recover from loss of ON flow-control messages by monitoring amount of time a first ingress queue has been identified in an off state and generating and forwarding a query to the egress flow-control manager if flow for the first ingress queue has been identified in the off state for at least some given time frame, wherein the query is to ascertain congestion state of a first egress queue that placed the first ingress queue in the off state, wherein the egress flow-control manager is to generate and forward an ON flow-control message if the congestion state of the first egress queue is not congested.

* * * * *